United States Patent
Agarwal et al.

(10) Patent No.: US 10,819,489 B2
(45) Date of Patent: Oct. 27, 2020

(54) REAL TIME ACK/NAK FROM LINK SNIFFING

(71) Applicant: QUALCOMM Incorporated, San Diego, CA (US)

(72) Inventors: Vishal Agarwal, Ramnagar (IN); Giriraj Goyal, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 16/207,991

(22) Filed: Dec. 3, 2018

(65) Prior Publication Data
US 2020/0177348 A1   Jun. 4, 2020

(51) Int. Cl.
*H04L 5/00* (2006.01)
*H04W 4/80* (2018.01)
*H04L 1/00* (2006.01)
*H04W 56/00* (2009.01)

(52) U.S. Cl.
CPC .......... *H04L 5/0055* (2013.01); *H04L 1/0007* (2013.01); *H04W 4/80* (2018.02); *H04W 56/004* (2013.01)

(58) Field of Classification Search
CPC ...... H04L 5/0055; H04L 1/0007; H04W 4/80; H04W 56/004
USPC .......................................................... 370/329
See application file for complete search history.

(56) References Cited

U.S. PATENT DOCUMENTS

| | | | |
|---|---|---|---|
| 2017/0251469 A1* | 8/2017 | Lee ......................... | H04W 4/80 |
| 2018/0317126 A1* | 11/2018 | Wang .................... | H04W 28/04 |
| 2019/0104424 A1* | 4/2019 | Hariharan ................ | H04R 3/12 |

\* cited by examiner

*Primary Examiner* — Hassan A Phillips
*Assistant Examiner* — Mohammed S Chowdhury
(74) *Attorney, Agent, or Firm* — Holland & Hart LLP/Qualcomm

(57) ABSTRACT

Methods, systems, and devices for real-time ACK/NACK are described. The method includes a primary wireless device receiving a transmission from a source wireless device over a wireless link established between the source wireless device and the primary wireless device, determining whether the primary wireless device correctly received a data packet during the transmission, determining whether a first indication of ACK is received from a secondary wireless device during a time gap after receiving the transmission from the source wireless device, the first indication associated with the transmission between the source wireless device and the primary wireless device, and sending a second indication of ACK or NACK to the source wireless device based on whether the primary wireless device correctly received the data packet and whether the first indication is received from the secondary wireless device during the time gap.

17 Claims, 11 Drawing Sheets

REAL TIME ACK/NAK FROM LINK SNIFFING

BACKGROUND

The following relates generally to wireless communications, and more specifically to improving acknowledgement-based protocols of wireless communication systems.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

In some cases, wireless communications may be designed to provide enhanced quality of service. For example, successful transmission (e.g., bidirectional transmission) of audio information for voice communications may have a relatively low tolerance for packet loss or timing issues. The link quality between two devices may affect the data rate used for communications (e.g., as poor link quality may be associated with reduced bitrates for more robust communications). Improved techniques for wireless communications are desired.

SUMMARY

The described techniques relate to improved methods, systems, devices, and apparatuses that support real-time ACK/NAK (acknowledgement/negative acknowledgement) from sniffing one or more links by controlling a size or length of one or more packets (e.g., controlling a maximum size of an attribute packet, controlling a size of a maximum transmission unit (MTU) of the logical link control and adaptation protocol (L2CAP), etc.).

For example, a secondary device may sniff packets between a source device to a primary device by monitoring a communication link between the source device and primary device and capturing packets of data sent by the source device to the primary device. Generally, the described techniques provide for enabling a primary wireless device to provide for acknowledging receipt of information for both the primary wireless device and a secondary wireless device.

In one example, the present techniques may include modifying an MTU size to enable real-time ACK/NACK between associated primary and secondary wireless devices based on the secondary wireless device sniffing communications between the primary wireless device and a source device, and enable real-time ACK/NACK between the primary wireless device and the source device based at least in part on the ACK/NACK from the secondary wireless device. In some cases, an ACK from the secondary wireless device may include the secondary wireless device sending an ACK message to the primary wireless device during a time gap created by the modification of the MTU size, while a NACK from the secondary wireless device may include the secondary wireless device refraining from sending an ACK during the time gap.

A method of acknowledging receipt of information is described. The method may include receiving, by a primary wireless device, a transmission from a source wireless device over a wireless link established between the source wireless device and the primary wireless device, determining, by the primary wireless device, whether the primary wireless device correctly received a data packet during the transmission, determining, by the primary wireless device, whether a first indication of ACK is received from a secondary wireless device during a time gap after receiving the transmission from the source wireless device, the first indication associated with the transmission between the source wireless device and the primary wireless device, and sending, by the primary wireless device, a second indication of ACK or NAK (which may also be referred to as NACK) to the source wireless device based on whether the primary wireless device correctly received the data packet and whether the first indication is received from the secondary wireless device during the time gap.

An apparatus for acknowledging receipt of information is described. The apparatus may include a processor, memory in electronic communication with the processor, and instructions stored in the memory. The instructions may be executable by the processor to cause the apparatus to receive, by a primary wireless device, a transmission from a source wireless device over a wireless link established between the source wireless device and the primary wireless device, determine, by the primary wireless device, whether the primary wireless device correctly received a data packet during the transmission, determine, by the primary wireless device, whether a first indication of ACK is received from a secondary wireless device during a time gap after receiving the transmission from the source wireless device, the first indication associated with the transmission between the source wireless device and the primary wireless device, and send, by the primary wireless device, a second indication of ACK or NACK to the source wireless device based on whether the primary wireless device correctly received the data packet and whether the first indication is received from the secondary wireless device during the time gap.

Another apparatus for acknowledging receipt of information is described. The apparatus may include means for receiving, by a primary wireless device, a transmission from a source wireless device over a wireless link established between the source wireless device and the primary wireless device, determining, by the primary wireless device, whether the primary wireless device correctly received a data packet during the transmission, determining, by the primary wireless device, whether a first indication of ACK is received from a secondary wireless device during a time gap after receiving the transmission from the source wireless device, the first indication associated with the transmission between the source wireless device and the primary wireless device, and sending, by the primary wireless device, a second indication of ACK or NACK to the source wireless device based on whether the primary wireless device correctly received the data packet and whether the first indication is received from the secondary wireless device during the time gap.

A non-transitory computer-readable medium storing code for acknowledging receipt of information is described. The code may include instructions executable by a processor to receive, by a primary wireless device, a transmission from a source wireless device over a wireless link established between the source wireless device and the primary wireless device, determine, by the primary wireless device, whether the primary wireless device correctly received a data packet during the transmission, determine, by the primary wireless device, whether a first indication of ACK is received from a secondary wireless device during a time gap after receiving the transmission from the source wireless device, the first indication associated with the transmission between the source wireless device and the primary wireless device, and send, by the primary wireless device, a second indication of ACK or NACK to the source wireless device based on whether the primary wireless device correctly received the data packet and whether the first indication is received from the secondary wireless device during the time gap.

Some examples of the method, apparatuses, and non-transitory computer-readable medium described herein may further include operations, features, means, or instructions for setting, based on determining whether the first indication may be received from the secondary wireless device, a packet size of at least one logical link control and adaptation protocol (L2CAP) packet to increase the time gap that may be between an end of the transmission from the source wireless device and a start time the primary wireless device may be scheduled to start transmitting the second indication.

Some examples of the method, apparatuses, and non-transitory computer-readable medium described herein may further include operations, features, means, or instructions for identifying, after determining that the first indication may be received from the secondary wireless device, a type of packet used for transmitting the first indication, and scheduling the start time based on the type of packet.

In some examples of the method, apparatuses, and non-transitory computer-readable medium described herein, receiving the first indication may include operations, features, means, or instructions for receiving the first indication during the time gap between the end of the transmission from the source wireless device and the start time, where the first indication may be associated with the transmission sniffed by the secondary wireless device between the source wireless device and the primary wireless device.

Some examples of the method, apparatuses, and non-transitory computer-readable medium described herein may further include operations, features, means, or instructions for determining that the secondary wireless device received the transmission without error after determining the first indication may be received within the time gap.

In some examples of the method, apparatuses, and non-transitory computer-readable medium described herein, sending the second indication may include operations, features, means, or instructions for sending an ACK in the second indication based on determining that the primary wireless device and the secondary wireless device received the transmission without error.

Some examples of the method, apparatuses, and non-transitory computer-readable medium described herein may further include operations, features, means, or instructions for determining that the secondary wireless device failed to receive the transmission or received the transmission with one or more errors after determining that the first indication may be not received within the time gap, where sending the second indication includes.

Some examples of the method, apparatuses, and non-transitory computer-readable medium described herein may further include operations, features, means, or instructions for receiving a first indication from the secondary wireless device, where receiving the transmission from the source wireless device and receiving the first indication may be performed over a same frequency.

Some examples of the method, apparatuses, and non-transitory computer-readable medium described herein may further include operations, features, means, or instructions for determining that the first indication includes a basic rate/enhanced data rate (BR/EDR) packet or a sequence that includes a preamble followed by an access code, where the time gap may be based on a length of time associated with the BR/EDR packet or the sequence.

In some examples of the method, apparatuses, and non-transitory computer-readable medium described herein, at least one of the primary wireless device and the secondary wireless device, or both, include a wireless earbud device. In some cases, the wireless link between the source wireless device and the primary wireless device includes an encrypted piconet link.

DETAILED DESCRIPTION

Figure 1:
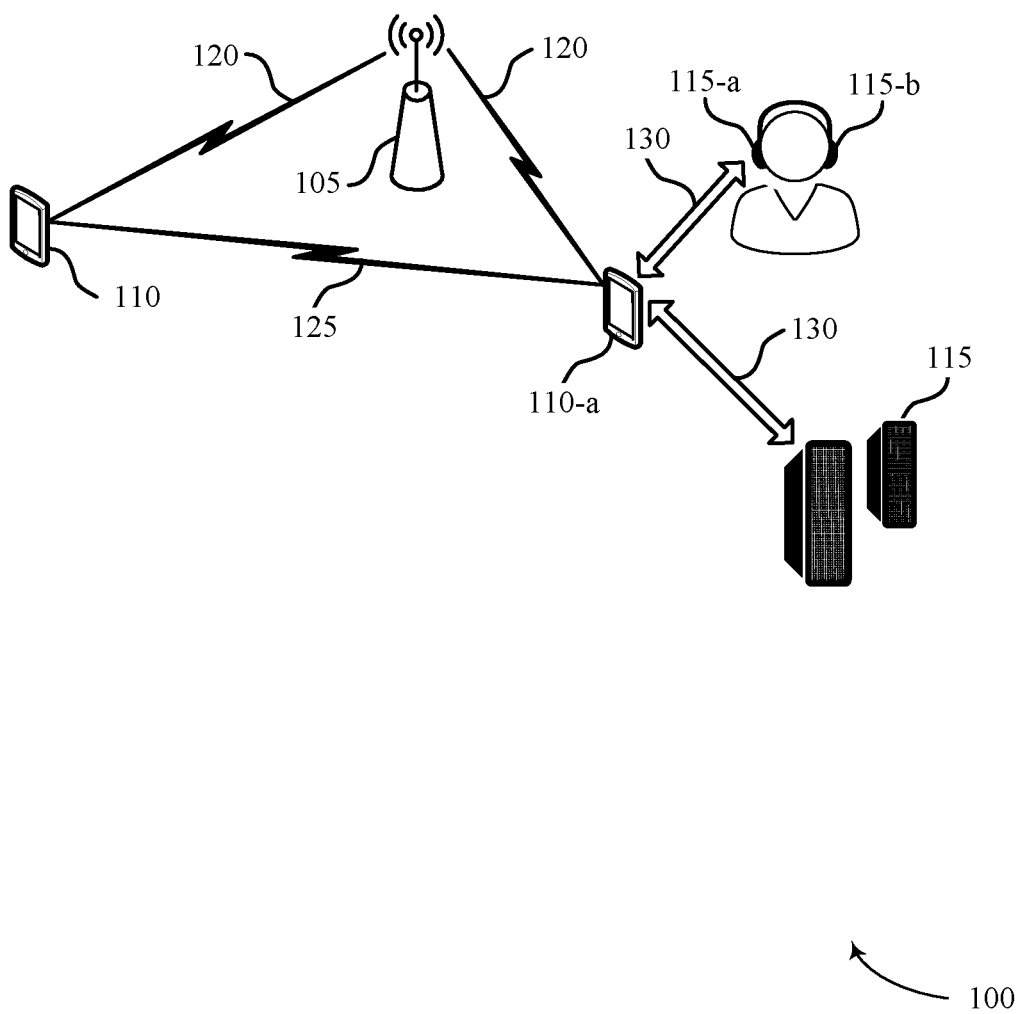
FIG. 1 illustrates an example of a system for real-time ACK/NAK that supports real-time ACK/NAK from sniffing one or more links by controlling a size of a predetermined packet size in accordance with aspects of the present disclosure.

The following relates generally to controlling a size of a unit (e.g., a maximum size of an attribute (ATT) packet, a maximum transmission unit (MTU)) associated with a protocol (e.g., a logical link control and adaptation protocol (L2CAP)) to enable real-time acknowledgement (ACK) and real-time negative acknowledgement (NAK) from a secondary wireless device that sniffs communications (e.g., between a source wireless device and a primary wireless device).

In one example, a primary wireless device may establish a link between the primary wireless device and a source wireless device. In some cases, the source wireless device may transmit data to the primary wireless device over the established link. In some cases, a secondary wireless device may listen and/or capture the data transmitted between the source wireless device and primary wireless device by sniffing communications sent over the link between the primary wireless device and a source wireless device. For example, a secondary wireless device may sniff packets between a source wireless device to a primary wireless device by monitoring a communication link between the source wireless device and primary wireless device and capturing packets of data sent by the source wireless device to the primary wireless device (e.g., sent to the primary wireless device but not to the secondary wireless device).

In some examples, the primary wireless device may determine whether a data packet from the source wireless device is correctly received (e.g., decrypt a data packet without error, perform error detection on the packet, perform authentication on a data packet, perform cyclic redundancy check, etc.). In some cases, the primary wireless device may determine whether an ACK is received from the secondary wireless device during a time gap, where the ACK from the secondary wireless device indicates the secondary wireless device correctly received the data from the transmission between the source wireless device and the primary wireless device that is sniffed by the secondary wireless device.

In some cases, the primary wireless device may send an ACK to the source wireless device when the primary wireless device confirms that the data received from the source wireless device over the established link is correctly received and/or when the primary wireless device confirms that the ACK is received from the secondary wireless device. In some cases, the primary wireless device may send a NAK to the source wireless device when either the primary wireless device confirms the data received from the source wireless device over the established link is not correctly received or when the primary wireless device confirms that the ACK from the secondary wireless device is not received. Accordingly, the present techniques include controlling a L2CAP MTU size to provide a time gap of sufficient size to enable the secondary wireless device to send an ACK to the primary wireless device based on the secondary wireless device sniffing communications between the source wireless device and the primary wireless device, and also enable the primary wireless device to send an ACK or NAK to the source wireless device based at least in part on whether the primary wireless device receives the ACK from the secondary wireless device.

The present techniques address the problem of a ACK/NAK from a primary wireless device accounting only for its own receive status and failing to account for a receive status of an associated secondary wireless device. The present techniques solve this problem with a low-latency solution and with a minimal increase in the audio latency in comparison to other single A2DP link solutions. The present techniques avoid retransmissions at the L2CAP/Profile level, thus avoiding increases to system and/or communication protocol complexity, audio latency, and the buffer requirements.

Aspects of the disclosure are initially described in the context of a wireless communications system. Aspects of the disclosure are further illustrated by and described with reference to apparatus diagrams, system diagrams, and flowcharts that relate to controlling a maximum size of one or more predetermined packets (e.g., setting a maximum size of an attribute packet, modifying and/or setting L2CAP MTU size, etc.) to enable real-time ACK/NAK from a secondary wireless device.

FIG. 1 illustrates a wireless communications system 100 (e.g., which may include to refer to or include a wireless personal area network (PAN), a wireless local area network (WLAN), a Wi-Fi network) configured in accordance with various aspects of the present disclosure. The wireless communications system 100 may include an AP 105, devices 110, and devices 115 (e.g., paired devices) implementing WLAN communications (e.g., Wi-Fi communications) and/or Bluetooth communications. For example, devices 110 may include cell phones, mobile stations, personal digital assistant (PDAs), other handheld devices, netbooks, notebook computers, tablet computers, laptops, or some other suitable terminology. Devices 115 may include Bluetooth devices capable of pairing with other Bluetooth devices (e.g., such as devices 110), which may include wireless headsets, speakers, ear pieces, headphones, display devices (e.g., TVs, computer monitors), microphones, meters, valves, etc.

Bluetooth communications may refer to a short-range communication protocol and may be used to connect and exchange information between devices 110 and devices 115 (e.g., between mobile phones, computers, digital cameras, wireless headsets, speakers, keyboards, mice or other input peripherals, and similar devices). Bluetooth systems (e.g., aspects of wireless communications system 100) may be organized using a master-slave relationship employing a time division duplex protocol having, for example, defined time slots of 625 mu secs, in which transmission alternates between the master device (e.g., a device 110) and one or more slave devices (e.g., devices 115). In some cases, a device 110 may generally refer to a master device, and a device 115 may refer to a slave device in a PAN. As such, in some cases, a device may be referred to as either a device 110 or a device 115 based on the Bluetooth role configuration of the device. That is, designation of a device as either a device 110 or a device 115 may not necessarily indicate a distinction in device capability, but rather may refer to or indicate roles held by the device in the PAN. Generally, device 110 may refer to a wireless communication device capable of wirelessly exchanging data signals with another device, and device 115 may refer to a device operating in a slave role, or to a short-range wireless device capable of exchanging data signals with the mobile device (e.g., using Bluetooth communication protocols).

A Bluetooth device may be compatible with certain Bluetooth profiles to use desired services. A Bluetooth profile may refer to a specification regarding an aspect of Bluetooth-based wireless communications between devices. That is, a profile specification may refer to a set of instructions for using the Bluetooth protocol stack in a certain way, and may include information such as suggested user interface formats, particular options and parameters at each layer of the Bluetooth protocol stack, etc. For example, a Bluetooth specification may include various profiles that define the behavior associated with each communication endpoint to implement a specific use case. Profiles may thus generally be defined according to a protocol stack that promotes and allows interoperability between endpoint devices from different manufacturers through enabling applications to discover and use services that other nearby Bluetooth devices may be offering. The Bluetooth specification defines device role pairs that together form a single use case called a profile. One example profile defined in the Bluetooth specification is the Handsfree Profile (HFP) for voice telephony, in which one device implements an Audio Gateway (AG) role and the other device implements a Handsfree (HF) device role. Another example is the Advanced Audio Distribution Profile (A2DP) for high-quality audio streaming, in which one device (e.g., device 110-a) implements an audio source device (SRC) role and another device (e.g., device 115-a and/or device 115-b) implements an audio sink device (SNK) role.

For a commercial Bluetooth device that implements one role in a profile to function properly, another device that implements the corresponding role must be present within the radio range of the first device. For example, in order for an HF device such as a Bluetooth headset to function according to the Handsfree Profile, a device implementing the AG role (e.g., a cell phone) must be present within radio range. Likewise, in order to stream high-quality mono or stereo audio according to the A2DP, a device implementing the SNK role (e.g., Bluetooth headphones or Bluetooth speakers) must be within radio range of a device implementing the SRC role (e.g., a stereo music player).

The Bluetooth specification defines a layered data transport architecture and various protocols and procedures to handle data communicated between two devices that implement a particular profile use case. For example, various logical links are available to support different application data transport requirements, with each logical link associated with a logical transport having certain characteristics (e.g., flow control, acknowledgement/repeat mechanisms, sequence numbering, scheduling behavior). The Bluetooth protocol stack is split in two parts: a "controller stack" containing the timing critical radio interface, and a "host stack" dealing with high level data. The controller stack is generally implemented in a low cost silicon device containing the Bluetooth radio and a microprocessor. The controller stack may be responsible for setting up links 130 such as asynchronous connection-less (ACL) links, synchronous connection orientated (SCO) links, etc. Further, the controller stack may implement link management protocol (LMP) functions, low energy link layer (LE LL) functions, etc. The host stack is generally implemented as part of an operating system, or as an installable package on top of an operating system. The host stack may be responsible for logical link control and adaptation protocol (L2CAP) functions, Bluetooth network encapsulation protocol (BNEP) functions, service discovery protocol (SDP) functions, etc. In some cases, the controller stack and the host stack may communicate via a host controller interface (HCI). In other cases, (e.g., for integrated devices such as Bluetooth headsets), the host stack and controller stack may be run on the same microprocessor to reduce mass production costs. For such "hostless systems," the HCI may be optional, and may be implemented as an internal software interface.

A link 130 established between two Bluetooth devices (e.g., between a device 110-a and device 115-a, and/or between 110-a and device 115-b) may provide for communications or services (e.g., according to some Bluetooth profile). For example, a Bluetooth connection may be an extended synchronous connection orientated (eSCO) link for voice call (e.g., which may allow for retransmission), an ACL link for music streaming (e.g., A2DP), etc. For example, eSCO packets may be transmitted in predetermined time slots (e.g., 6 Bluetooth slots each for eSCO). The regular interval between the eSCO packets may be specified when the Bluetooth link is established. The eSCO packets to/from a specific slave device (e.g., device 115-a and/or device 115-b) are acknowledged, and may be retransmitted if not acknowledged during a retransmission window. In addition, audio may be streamed between the device 110-a and device 115-a using an ACL link (A2DP profile), and/or between device 110-a and device 115-b using the same ACL link or an additional ACL link. In some cases, the ACL link may occupy 1, 3, or 5 Bluetooth slots for data or voice. Other Bluetooth profiles supported by Bluetooth devices may include Bluetooth Low Energy (BLE) (e.g., providing considerably reduced power consumption and cost while maintaining a similar communication range), human interface device profile (HID) (e.g., providing low latency links with low power requirements), etc.

In some cases, a device may be capable of both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some cases, Bluetooth and WLAN communications may share a same medium, such as the same unlicensed frequency medium. In such cases, a device 110 may support WLAN communications via AP 105 (e.g., over communication links 120). The AP 105 and the associated devices 110 may represent a basic service set (BSS) or an extended service set (ESS). The various devices 110 in the network may be able to communicate with one another through the AP 105. In some cases the AP 105 may be associated with a coverage area, which may represent a basic service area (BSA).

Devices 110 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within wireless communications system 100. AP 105 may be coupled to a network, such as the Internet, and may enable a device 110 to communicate via the network (or communicate with other devices 110 coupled to the AP 105). A device 110 may communicate with a network device bi-directionally. For example, in a WLAN, a device 110 may communicate with an associated AP 105 via downlink (e.g., the communication link from the AP 105 to the device 110) and uplink (e.g., the communication link from the device 110 to the AP 105).

In some examples, content, media, audio, etc. exchanged between a device 110 and a device 115 may originate from a WLAN. For example, in some cases, device 110-a may receive audio from an AP 105 (e.g., via WLAN communications), and the device 110-a may then implement the described techniques to relay or pass the audio to the device 115-a and/or device 115-b (e.g., via Bluetooth communications). In some cases, certain types of Bluetooth communications (e.g., such as high quality or high definition (HD) Bluetooth) may require enhanced quality of service. For example, in some cases, delay-sensitive Bluetooth traffic may have higher priority than WLAN traffic.

In some cases, device 110-a may be a source device to device 115-a and/or to device 115-b. In one example, device 115-a may be considered a primary device that establishes link 130 with device 110-a, while device 115-b may be considered a secondary device that sniffs data from communication between device 110-a and device 115-a over link 130. In some cases, the present techniques may include controlling a maximum size of one or more predetermined packets (e.g., setting a maximum size of an attribute packet, modifying and/or setting L2CAP MTU size, etc.) to enable real-time ACK/NAK between device 115-b and device 115-a based on device 115-b sniffing communications between device 110-a and device 110-a, and real-time ACK/NAK between device 115-a and source device 110-a based at least in part on the ACK/NAK from device 115-b. In some cases, an ACK from device 115-b may include device 115-b sending an ACK message to device 115-a during a time gap based on or determined by the L2CAP MTU size, while a NAK from device 115-b may include the device 115-b refraining from sending an ACK during the time gap.

Figure 2:
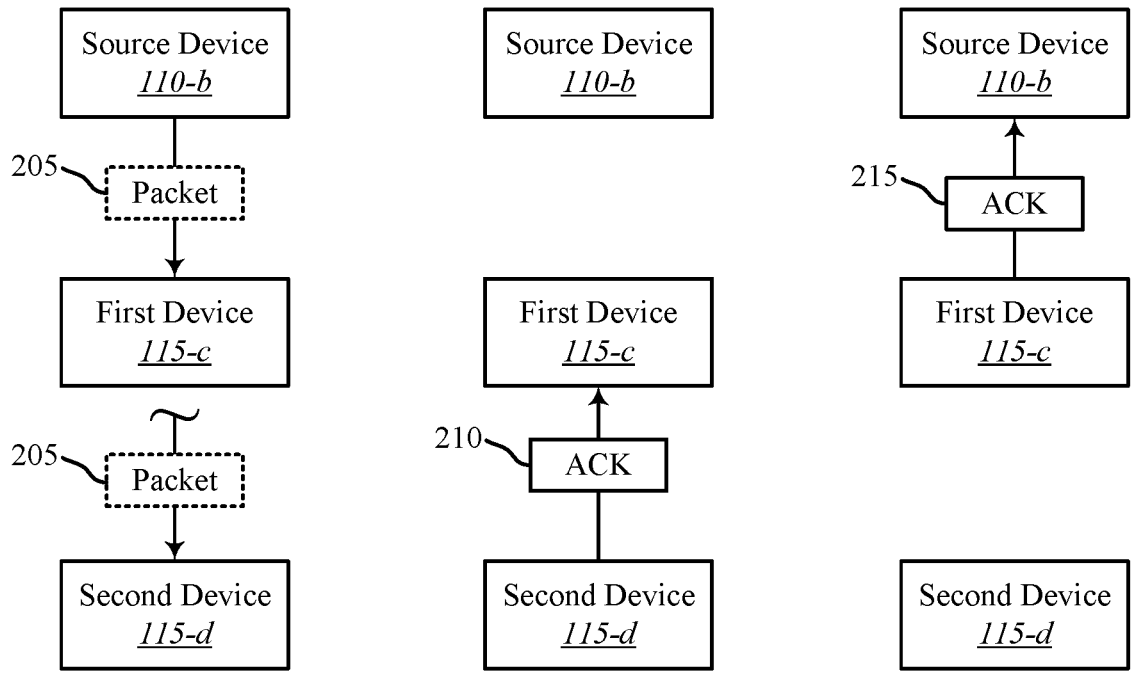
FIG. 2 illustrates an example of a wireless communication system that supports real-time ACK/NAK from sniffing one or more links by controlling a size of a predetermined packet in accordance with aspects of the present disclosure.
Figure 2:
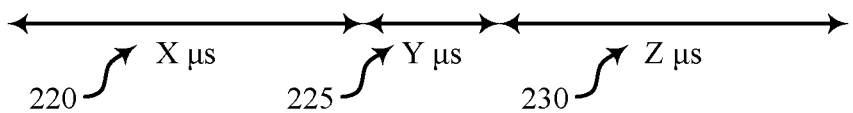

FIG. 2 illustrates an example of a wireless communication system 200 that supports real-time ACK/NAK from sniffing one or more links by controlling a maximum size of one or more predetermined packets (e.g., setting a maximum size of an attribute packet, modifying and/or setting L2CAP MTU size, etc.) in accordance with aspects of the present disclosure. In some examples, wireless communication system 200 may implement aspects of wireless communications system 100.

As illustrated, system 200 includes source device 110-b, first device 115-c (e.g., primary device), and second device 115-d (e.g., secondary device). The source device 110-b may be an example of device 110-a from FIG. 1. Similarly, first device 115-c may be an example of device 115-a and/or second device 115-d may be an example of device 115-b from FIG. 1. In one example, source device 110-b may be a wireless audio playing device (e.g., handheld music player, smartphone), while first device 115-c and second device 115-d may be audio listening devices (e.g., earbuds, earphones).

In one example, first device 115-c may provide ACK/NAK information to source device 110-b to confirm data transmissions from source device 110-b to first device 115-c over a link between first device 115-c and source device 110-b (e.g., link 130 of FIG. 1). The present techniques enable first device 115-c to indicate the receive status of at least one of if not both of first device 115-c and second device 115-d. In some cases, the present techniques may include using an idle time gap between source device 110-b transmitting data to first device 115-c and a subsequent transmission from first device 115-c to source device 110-b (e.g., transmitting ACK/NAK to source device 110-b in response to the source device 110-b transmitting the data).

In some cases, however, the time gap between the end of the source device 110-b transmitting the data to first device 115-c and the start of the next transmission from first device 115-c may not be sufficient to receive an ACK/NAK from second device 115-d using other techniques. However, the indicated time gap may be increased by limiting, in line with aspects of the present disclosure, the packet size (e.g., the L2CAP packet size). Increasing the indicated time gap may enable second device 115-d to transmit an ACK/NAK status to first device 115-c and still provide time for first device 115-c to transmit an ACK/NAK status to source device 110-a based at least in part on the ACK/NAK status from second device 115-d.

As shown, source device 110-b may transmit packet 205 (e.g., data packet, audio data packet) to first device 115-c. For example, source device 110-b may send packet 205 over a link (e.g., link 130 of FIG. 1). In some cases, second device 115-d may be configured to sniff packets (e.g., listen for and capture packets) sent between source device 110-b and first device 115-c. Accordingly, as shown second device 115-d may sniff packet 205 from source device 110-b. In some examples, second device 115-d may send ACK 210 to first device 115-c after second device 115-d determines that packet 205 was correctly received by second device 115-d from source device 110-b. Similarly, first device 115-c may determine whether packet 205 is correctly received by first device 115-c from source device 110-b. After determining first device 115-c correctly received packet 205 and that ACK 210 is received from second device 115-d, first device 115-c may send ACK 215 to source device 110-b.

As shown, system 200 may include an interframe space (IFS) 220 of X microseconds (μs), a time gap 225 of Y μs, and IFS 230 of Z μs. Although the size of IFS 220, time gap 225, and IFS 230 are measured based on time, in some cases, their size or length may be measured based on bytes or number of symbols (e.g., 19 bytes, 12 symbols). In some cases, the length of IFS 220 and/or IFS 230 may additionally and/or alternatively be based on a type of a frame implemented (e.g., Bluetooth low energy (BLE) frame, IEEE 802.15.4 frame).

In some cases, the X μs of IFS 220 may have a range of 50 μs to 300 μs; the Y μs of time gap 225 may have a range of 1 μs to 150 μs; and the Z μs of IFS 230 may have a range of 50 μs to 300 μs. For example, one implementation of system 200 may include an IFS 220 of 150 μs, a time gap 225 of 72 μs, and IFS 230 of 150 μs, for a total span of 372 μs between an end of transmission of packet 205 from source device 110-b and start of transmission of ACK 215 from first device 115-c. Based on the capabilities of firmware and radio resources (among other factors or parameters) of source device 110-b, first device 115-c, and/or second device 115-d, an IFS of more or less than 150 μs may be used for IFS 220 and/or IFS 230. In some cases, the L2CAP MTU size may be calculated based on the length of the implemented IFS for IFS 220 and/or IFS 230.

In some cases, second device 115-d may indicate ACK 210 by transmitting a determined type of message to first device 115-c during time gap 225. In some cases, second device 115-d may select a type of message to indicate ACK 210 to first device 115-c based on a value (e.g., in microseconds) of IFS 220, time gap 225, and/or IFS 230. In some examples, second device 115-d may send a message to first device 115-c that includes a sequence, where first device 115-c interprets receiving the message during time gap 225 as ACK 210. In some cases, the sequence may include a preamble followed by an access code. In some cases, the access code may be mutually agreed upon between first device 115-c and second device 115-d. In some examples, the sequence may include a preamble based on a data rate of 1 Megabit per second (Mbps), a data rate of 2 Mbps, or a data rate of 3 Mbps for system 200. Similarly, the sequence may include an access code based on a data rate of 1 Mbps for system 200, a data rate of 2 Mbps, or a data rate of 3 Mbps for system 200. In some cases, second device 115-d may send a Bluetooth basic rate (BR) packet to first device 115-c as the message that indicates ACK 210 to first device 115-c. Additionally or alternatively, second device 115-d may send a Bluetooth enhanced data rate (EDR) packet to first device 115-c as the message that indicates ACK 210 to first device 115-c.

In some cases, source device 110-*b* may use a first frequency to send packet 205 to first device 115-*c*. In some example, second device 115-*d* may use the first frequency to send ACK 210 to first device 115-*c*. In some cases, second device 115-*d* using the first frequency to send ACK 210 may allow first device 115-*c* to receive both packet 205 and ACK 210 without tuning or changing its reception frequency. For example, first device 115-*c* may receive packet 205 based on listening to the first frequency, and then receive ACK 210 by continuing to listen to first frequency. First device 115-*c* may, however, receive packet 205 based on a first access code established between first device 115-*c* and source device 110-*b*, and receive ACK 210 based on a second access code established between first device 115-*c* and second device 115-*d*, where the second access code may be different than the first access code. In some cases, second device 115-*d* may use a second frequency different than the first frequency to send ACK 210 to first device 115-*c*

In some examples, a start time for the start of the transmission of ACK 215 from first device 115-*c* to source device 110-*b* may be scheduled by first device 115-*c* and/or second device 115-*d*. In some cases, a start time for the transmission of ACK 215 may be a fixed value relative to a start of a primary TX boundary (e.g., start of the transmission of ACK 215, end of IFS 230). In some cases, the start time for the transmission of ACK 215 may be based on a value for the start of the primary TX boundary that is determined based at least in part on a message second device 115-*d* uses to send ACK 210. In some cases, knowing the message second device 115-*d* will use or does use to send ACK 210 may enable first device 115-*c* and/or second device 115-*d* to schedule the start time in advance based on the packet type used for ACK 210. In some cases, first device 115-*c* may communicate with second device 115-*d* an indication of which message to use to send ACK 210. Alternatively, second device 115-*d* may select which message to use to send ACK 210 and first device 115-*c* may discover the message used after receiving ACK 210. In one example, when the packet used is a BR/EDR ID packet, then the start time of ACK packet may be 150 μs+68 μs=218 μs+/−2 μs before the primary TX boundary, allowing first device 115-*c* and/or second device 115-*d* to schedule the start time in advance just based on the packet type.

Figure 3:
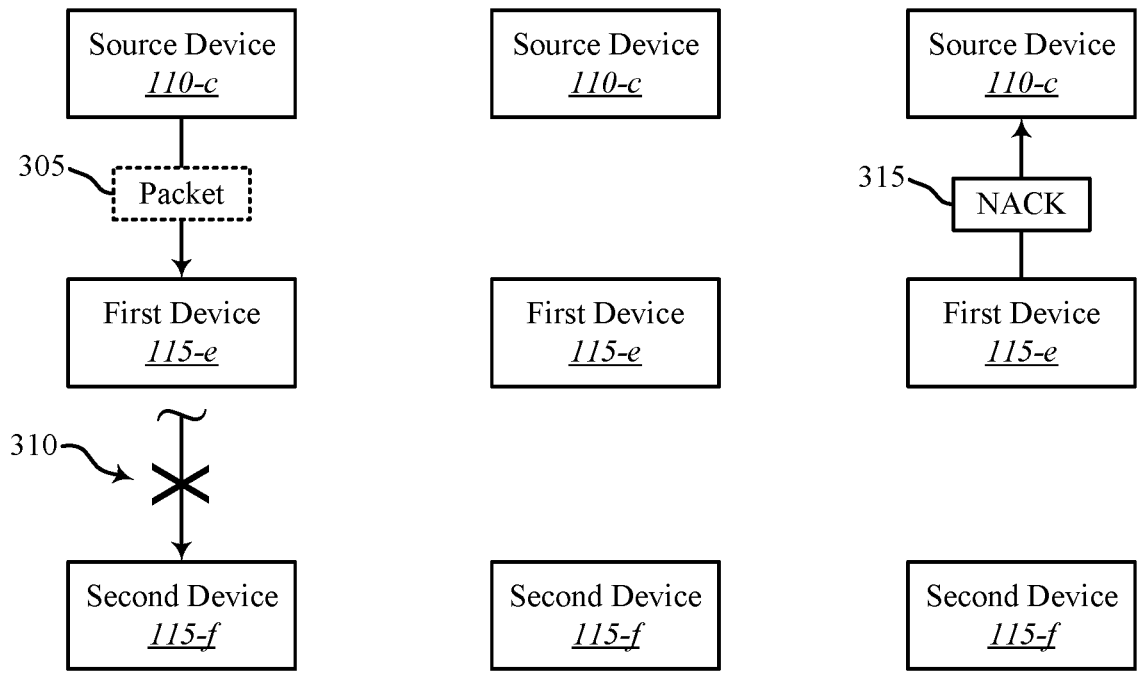
FIG. 3 illustrates an example of a wireless communication system that supports real-time ACK/NAK from sniffing one or more links by controlling a size of a predetermined packet in accordance with aspects of the present disclosure.
Figure 3:
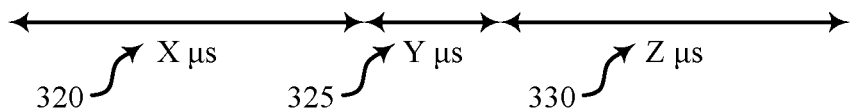

FIG. 3 illustrates an example of a wireless communication system 300 that supports real-time ACK/NAK from sniffing one or more links by controlling L2CAP MTU size in accordance with aspects of the present disclosure. In some examples, wireless communication system 300 may implement aspects of wireless communications system 100.

As illustrated, system 300 includes source device 110-*c*, first device 115-*e*, and second device 115-*f*. The illustrated source device 110-*c* may be an example of device 110-*a* or source device 110-*b*, or both from FIG. 1 and FIG. 2, respectively. Similarly, first device 115-*e* may be an example of device 115-*a* or first device 115-*c*, or both, from FIGS. 1 and 2, respectively, and/or second device 115-*f* may be an example of device 115-*b* or second device 115-*d*, or both, from FIG. 1 and FIG. 2, respectively.

As illustrated, system 300 may include an interframe space (IFS) 320 of X microseconds (μs), a time gap 325 of Y μs, and IFS 330 of Z μs. Although the size of IFS 320, time gap 325, and IFS 330 are measured based on time, in some cases, their size or length may be measured based on bytes or number of symbols (e.g., 19 bytes, 12 symbols). In some cases, the length of IFS 320 and/or IFS 330 may additionally or alternatively be based on a type of a frame implemented (e.g., Bluetooth low energy (BLE) frame, IEEE 802.15.4 frame).

As shown, source device 110-*c* may transmit packet 305 (e.g., data packet, audio data packet) to first device 115-*e*. For example, source device 110-*c* may send packet 305 over a link (e.g., link 130 of FIG. 1). In some cases, second device 115-*f* may be configured to sniff packets (e.g., listen for and captured packets) sent between source device 110-*c* and first device 115-*e*. However, as shown at 310 second device 115-*f* may fail to receive packet 305 from source device 110-*c* (e.g., receiving packet 305 with errors such as a cyclic redundancy check (CRC) error, message integrity check (MIC) error, never receiving packet 305, a buffer error in second device 115-*f*).

In some cases, second device 115-*f* may refrain from sending an ACK to first device 115-*e* after failing to receive packet 305 from source device 110-*c*. In some cases, first device 115-*e* may determine whether an ACK from second device 115-*f* is received within or before the end of time gap 325. Also, first device 115-*e* may determine whether packet 305 is correctly received by first device 115-*e* from source device 110-*c*. After first device 115-*e* determines it failed to correctly receive packet 305 and/or that secondary device 115-*f* does not send an ACK for packet 305 within time gap 325, first device 115-*e* may send NAK 315 to source device 110-*c*.

Figure 4:
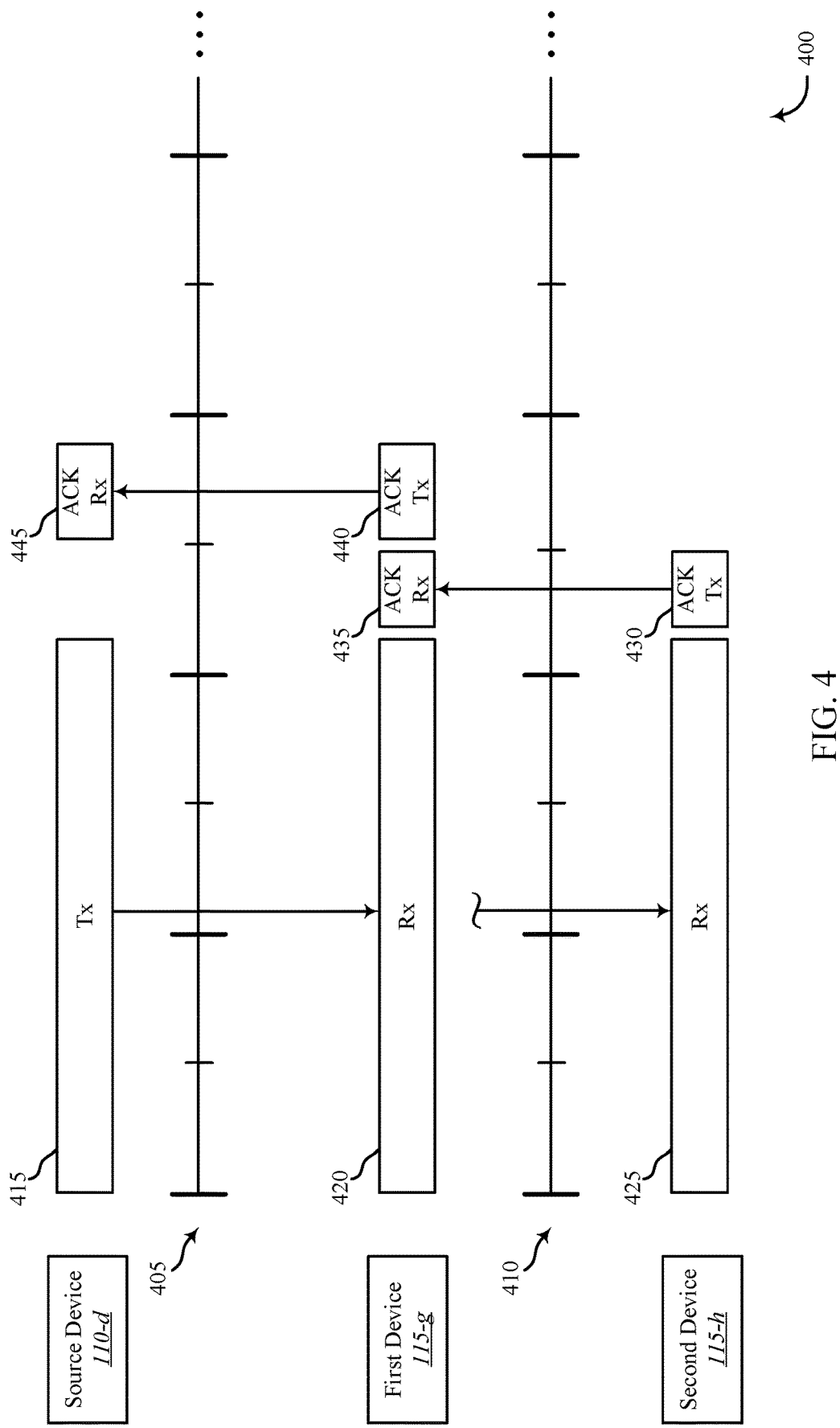
FIG. 4 illustrates an example of a wireless communication system that supports real-time ACK/NAK from sniffing one or more links by controlling a size of a predetermined packet in accordance with aspects of the present disclosure.

FIG. 4 illustrates an example of a wireless communication system 400 that supports real-time ACK/NAK from sniffing one or more links by controlling L2CAP MTU size in accordance with aspects of the present disclosure. In some examples, wireless communication system 400 may implement aspects of wireless communications system 100.

As illustrated, system 400 includes source device 110-*d*, first device 115-*g*, and second device 115-*h*. The illustrated source device 110-*d* may be an example of device 110-*a*, or source device 110-*b*, or source device 110-*c*, or any combination thereof, from FIGS. 1, 2, and 3, respectively. Similarly, first device 115-*g* may be an example of device 115-*a*, or first device 115-*c*, or first device 115-*e*, or any combination thereof, from FIGS. 1, 2, and 3, respectively, and/or second device 115-*h* may be an example of device 115-*b*, or second device 115-*d*, or second device 115-*f*, or any combination thereof, from FIGS. 1, 2, and 3, respectively.

In the illustrated example, piconet 405 may be established between source device 110-*d* and first device 115-*g*, while piconet 410 may be established between first device 115-*g* and second device 115-*h*. As shown, source device 110-*d* may send transmission 415 to first device 115-*g*. In some cases, source device 110-*d* may send data transmission 415 to first device 115-*g* over piconet 405. As shown, first device 115-*g* may receive transmission 415 as data reception 420. In some cases, transmission 415 may be sent in a data package selected by source device 110-*d* based on the payload being sent to first device 115-*g*. In the illustrated example, source device 110-*d* may select a package that is transmitted over 5 time slots (e.g., 2-DH5, 3-DH5).

In some cases, a transmitting device (e.g., first device 115-*g* or second device 115-*h*) may select a package type based at least in part on at least one of a size of available package types (e.g., a number of slots used by an available package types or bitwise size of available package types, a payload size associated with an upcoming transmission or requested transmission, an amount of radio frequency noise in the operating environment, or any combination thereof). In a low noise area, as one example, relatively large buffers of application data may be transmitted in several DH5 packages, and relatively small buffers may be transmitted in one DH1 package. In some cases, each package type fits into one or more timeslots (e.g., a DH1 package type uses 1 timeslot, a DH3 package type uses 3 timeslots, a DH5 uses 5 timeslots).

In some cases, second device 115-*h* may sniff packets sent over piconet 405 between source device 110-*d* and first device 115-*g*. For example, second device 115-*h* may sniff data transmission 415 sent by source device 110-*d* on piconet 405. As shown, second device 115-*h* may sniff transmission 415 as data reception 425.

In some cases, second device 115-*h* may send ACK transmission 430 to first device 115-*g* over piconet 410. In some cases, second device 115-*h* may send ACK transmission 430 after verifying data reception 425 (e.g., verifying data reception 425 is decrypted and/or authenticated without error). As shown, first device 115-*g* may receive ACK transmission 430 as ACK reception 435. In some cases, first device 115-*g* may verify data reception 420 (e.g., decrypting and/or authenticating data reception 420 without error) and determine whether an ACK is received from second device 115-*h*. After verifying data reception 420 and determining ACK reception 435 is received from second device 115-*h*, first device 115-*g* may send ACK transmission 440 to source device 110-*d* on piconet 405. As shown, source device 110-*d* may receive ACK transmission 440 as ACK reception 445.

In some cases, enabling second device 115-*h* sufficient time to transmit an ACK to first device 115-*h* before first device 115-*h* is to send an ACK to source device 110-*d* may be achieved by a reduction (e.g., a relatively small reduction) to the maximum transmission unit (MTU) limit. For example, if the L2CAP MTU were capped to 640 bytes (e.g., 644 bytes−4 bytes), then a 2-DH5 package would leave 375 µs between the end of data reception 420 to the start of first device 115-*g* sending ACK transmission 440, while a 3-DH5 package would provide even more time for second device 115-*h* to send an ACK to first device 115-*g*. Accordingly, adjusting a size (e.g., a maximum size) of a predetermined packet (e.g., attribute packet, L2CAP MTU size, etc.) provides a time gap of sufficient length for which second device 115-*h* may transmit an ACK to first device 115-*h* before first device 115-*h* is scheduled to send an ACK to source device 110-*d*.

Figure 5:
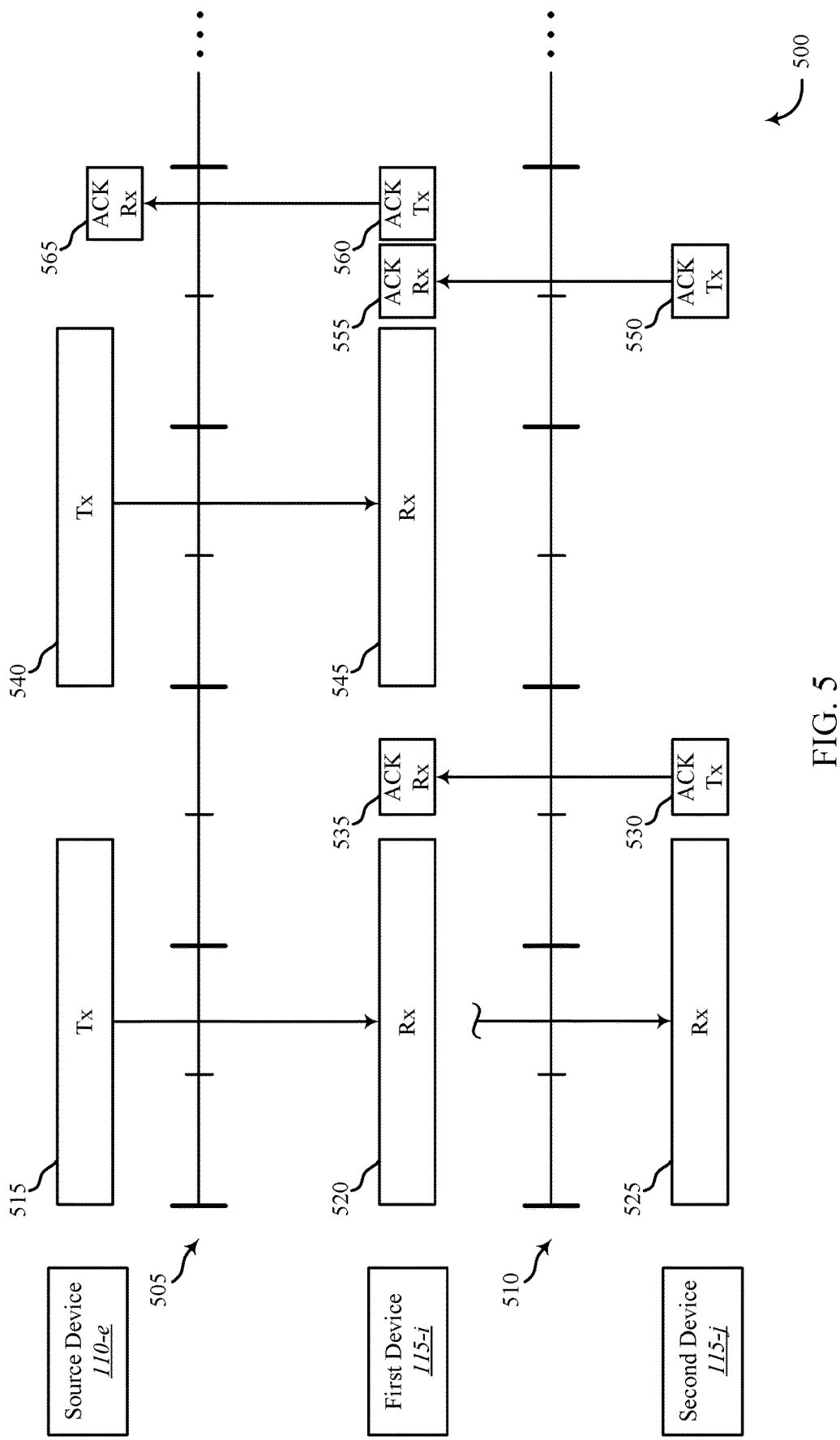
FIG. 5 illustrates an example of a wireless communication system that supports real-time ACK/NAK from sniffing one or more links by controlling a size of a predetermined packet in accordance with aspects of the present disclosure.

FIG. 5 illustrates an example of a wireless communication system 500 that supports real-time ACK/NAK from sniffing one or more links by controlling L2CAP MTU size in accordance with aspects of the present disclosure. In some examples, wireless communication system 500 may implement aspects of wireless communications system 100.

As illustrated, system 500 includes source device 110-*e*, first device 115-*i*, and second device 115-*j*. The illustrated source device 110-*e* may be an example of device 110-*a*, or source device 110-*b*, or source device 110-*c*, or source device 110-*d*, or any combination thereof, from FIGS. 1, 2, 3, and 4, respectively. Similarly, first device 115-*i* may be an example of device 115-*a*, or first device 115-*c*, or first device 115-*e*, or first device 115-*g*, or any combination thereof, from FIGS. 1, 2, 3, and 4, respectively, and/or second device 115-*j* may be an example of device 115-*b*, or second device 115-*d*, or second device 115-*f*, or second device 115-*h*, or any combination thereof, from FIGS. 1, 2, 3, and 4, respectively.

In the illustrated example, piconet 505 may be established between source device 110-*e* and first device 115-*i*, while piconet 510 may be established between first device 115-*i* and second device 115-*j*. As shown, source device 110-*e* may send data transmission 515 to first device 115-*i*. In some cases, source device 110-*e* may send data transmission 515 to first device 115-*i* over piconet 505. As shown, first device 115-*i* may receive data transmission 515 as data reception 520. In some cases, data transmission 515 may be sent in a data package selected by source device 110-*e* based on the payload being sent to first device 115-*i*. In the illustrated example, source device 110-*e* may select a package that is transmitted over 3 time slots (e.g., 2-DH3, 3-DH3).

In some cases, second device 115-*j* may sniff packets sent over piconet 505 between source device 110-*e* and first device 115-*i*. For example, second device 115-*j* may sniff data transmission 515 sent by source device 110-*e* on piconet 505. As shown, second device 115-*j* may sniff data transmission 515 as data reception 525.

In some cases, second device 115-*j* may send ACK transmission 530 to first device 115-*i* over piconet 510. In some cases, second device 115-*j* may send ACK transmission 530 after verifying data reception 525. As shown, first device 115-*i* may receive ACK transmission 530 as ACK reception 535. Because of the relatively narrow margins involved in transmitting some information, such as 3-slot packages, first device 115-*i* may refrain from sending an ACK to source device 110-*e* directly after receiving ACK reception 535 from second device 115-*j*.

As shown, source device 110-*e* may send transmission 540 to first device 115-*i*. In some cases, source device 110-*e* may send data transmission 540 to first device 115-*i* over piconet 505. As shown, first device 115-*i* may receive transmission 540 as data reception 545. In some cases, second device 115-*j* may send ACK transmission 550 to first device 115-*i* over piconet 510. In some cases, second device 115-*j* may send ACK transmission 550 after verifying data reception 525.

In some examples, first device 115-*i* may receive ACK transmission 550 as ACK reception 555. In some cases, first device 115-*i* may verify data reception 545 and determine whether an ACK is received from second device 115-*j*. After verifying data reception 545 and determining ACK reception 555 is received from second device 115-*j*, first device 115-*i* may send ACK transmission 560 to source device 110-*e* on piconet 505. As shown, source device 110-*e* may receive ACK transmission 560 as ACK reception 565. Accordingly, the present techniques enable second device 115-*j* to send an ACK to first device 115-*i* based on transmission of 3-slot packages, and for first device 115-*i* to send an ACK to source device 110-*e* based on first device 115-*i* receiving a transmission from source device 110-*e* without error and the ACK from second device 115-*j*.

Figure 6:
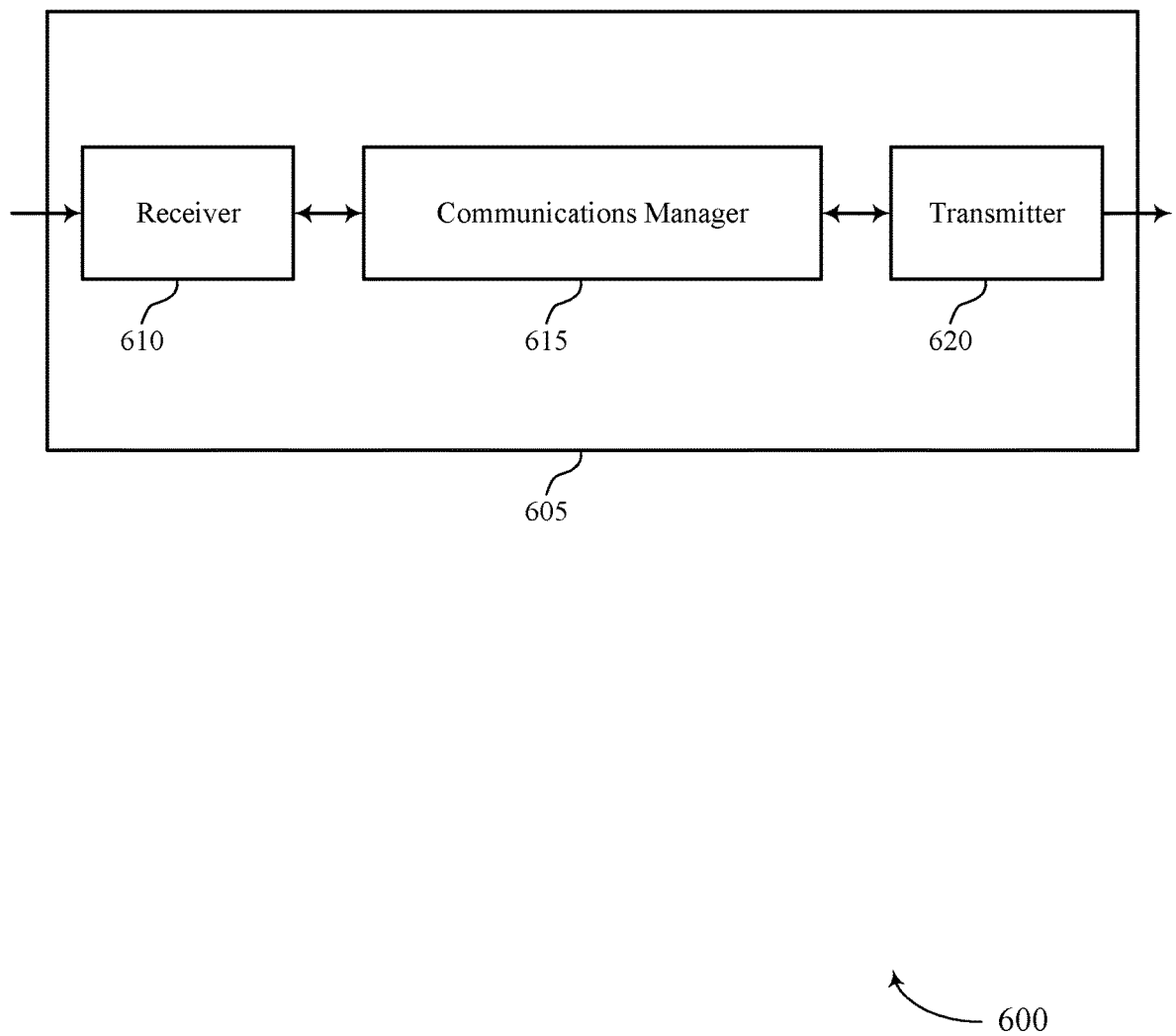
FIGS. 6 and 7 show block diagrams of devices that support real-time ACK/NAK from sniffing one or more links by controlling a size of a predetermined packet in accordance with aspects of the present disclosure.

FIG. 6 shows a block diagram 600 of a device 605 that supports real-time ACK/NAK from sniffing one or more links by controlling L2CAP MTU size in accordance with aspects of the present disclosure. The device 605 may be an example of aspects of a device as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to real-time ACK/NAK from sniffing link by controlling L2CAP MTU size). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, by a primary wireless device, a transmission from a source wireless device over a wireless link established between the source wireless device and the primary wireless device, determine, by the primary wireless device, whether the primary wireless device correctly received a data packet during the transmission, determine, by the primary wireless device, whether a first indication of ACK is received from a secondary wireless device during a time gap after receiving the transmission from the source wireless device, the first indication associated with the transmission between the source wireless device and the primary wireless device, and send, by the primary wireless device, a second indication of ACK or NAK to the source wireless device based on whether the primary wireless device correctly received the data packet and whether the first indication is received from the secondary wireless device during the time gap. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
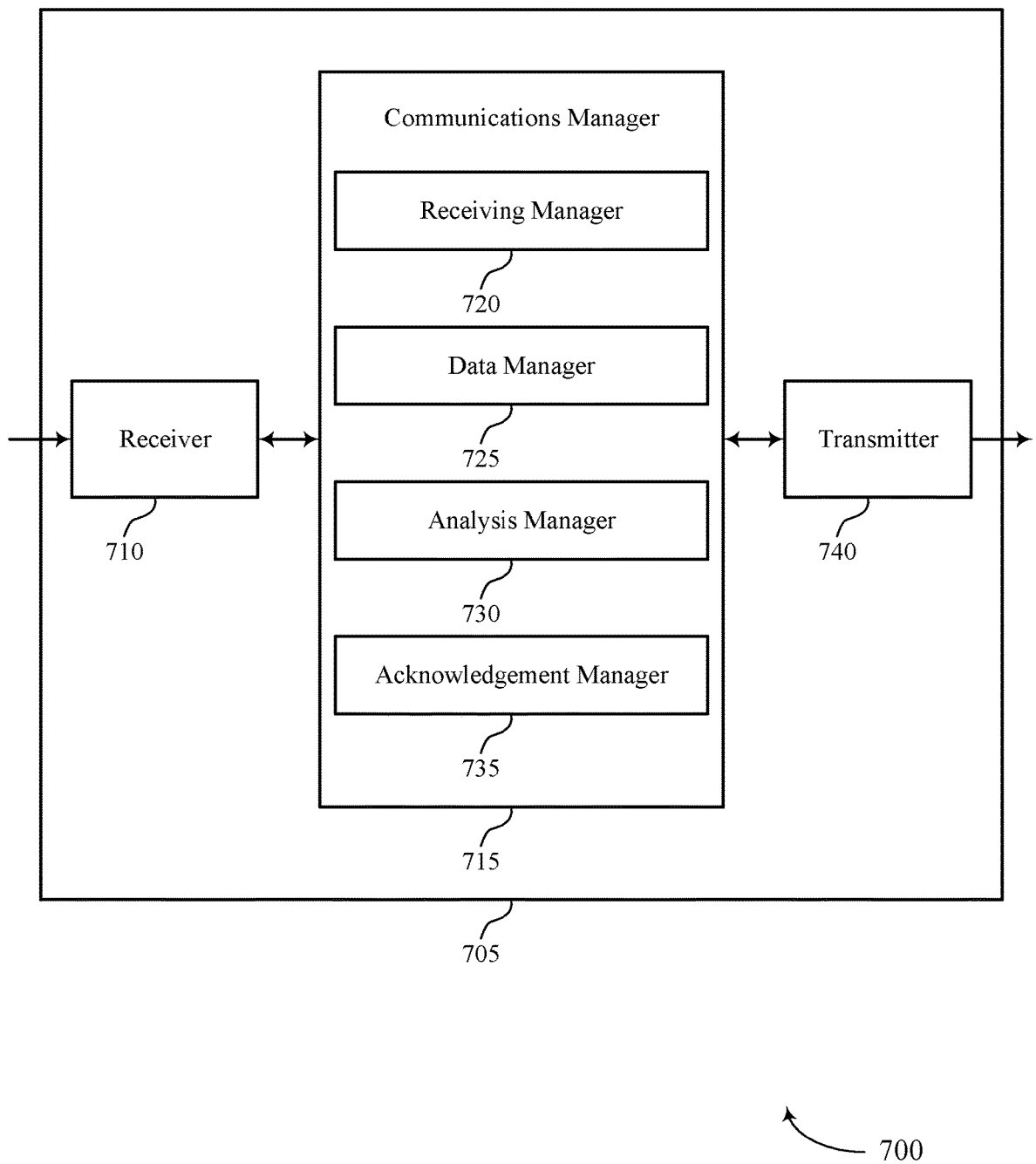

FIG. 7 shows a block diagram 700 of a device 705 that supports real-time ACK/NAK from sniffing one or more links by controlling L2CAP MTU size in accordance with aspects of the present disclosure. The device 705 may be an example of aspects of a device 605 or a device 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to real-time ACK/NAK from sniffing link by controlling L2CAP MTU size). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a receiving manager 720, a data manager 725, an analysis manager 730, and an acknowledgement manager 735. The communications manager 715 may be an example of aspects of the communications manager 910 described herein.

The receiving manager 720 may receive, by a primary wireless device, a transmission from a source wireless device over a wireless link established between the source wireless device and the primary wireless device. The data manager 725 may determine, by the primary wireless device, whether the primary wireless device correctly received a data packet during the transmission. The analysis manager 730 may determine, by the primary wireless device, whether a first indication of ACK is received from a secondary wireless device during a time gap after receiving the transmission from the source wireless device, the first indication associated with the transmission between the source wireless device and the primary wireless device.

The acknowledgement manager 735 may send, by the primary wireless device, a second indication of ACK or NAK to the source wireless device based on whether the primary wireless device correctly received the data packet and whether the first indication is received from the secondary wireless device during the time gap. The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
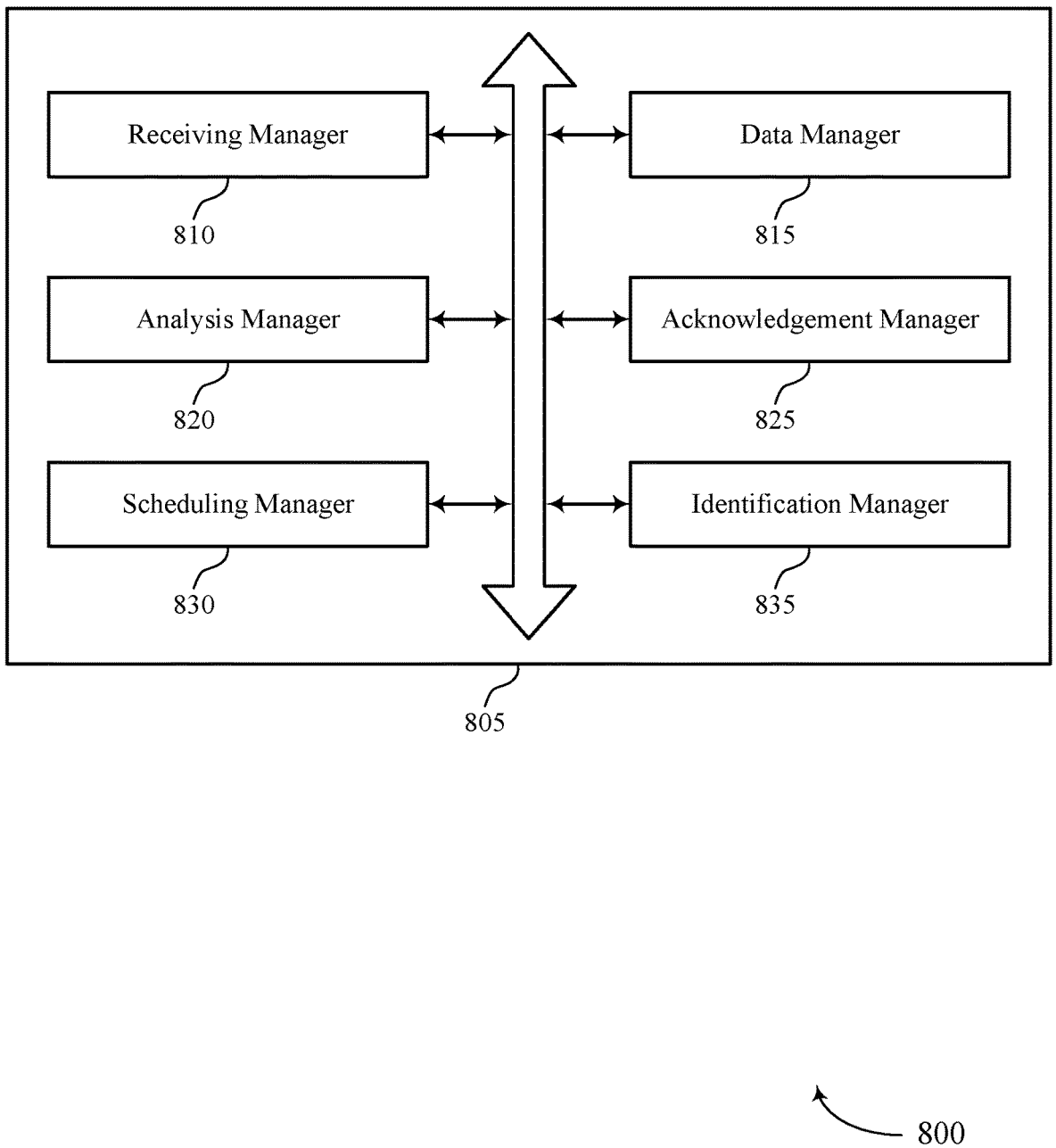
FIG. 8 shows a block diagram of a communications manager that supports real-time ACK/NAK from sniffing one or more links by controlling a size of a predetermined packet in accordance with aspects of the present disclosure.

FIG. 8 shows a block diagram 800 of a communications manager 805 that supports real-time ACK/NAK from sniffing one or more links by controlling L2CAP MTU size in accordance with aspects of the present disclosure. The communications manager 805 may be an example of aspects of a communications manager 615, a communications manager 715, or a communications manager 910 described herein. The communications manager 805 may include a receiving manager 810, a data manager 815, an analysis manager 820, an acknowledgement manager 825, a scheduling manager 830, and an identification manager 835. Each of these modules may communicate, directly or indirectly, with one another (e.g., via one or more buses).

The receiving manager 810 may receive, by a primary wireless device, a transmission from a source wireless device over a wireless link established between the source wireless device and the primary wireless device. In some examples, the receiving manager 810 may receive the first indication during the time gap between the end of the transmission from the source wireless device and the start time, where the first indication is associated with the transmission sniffed by the secondary wireless device between the source wireless device and the primary wireless device.

In some examples, the receiving manager 810 may receive a first indication from the secondary wireless device, where receiving the transmission from the source wireless device and receiving the first indication are performed over a same frequency. In some cases, at least one of the primary wireless device and the secondary wireless device, or both, include a wireless earbud device. In some cases, the wireless link between the source wireless device and the primary wireless device includes an encrypted piconet link.

The data manager 815 may determine, by the primary wireless device, whether the primary wireless device correctly received a data packet during the transmission. The analysis manager 820 may determine, by the primary wireless device, whether a first indication of ACK is received from a secondary wireless device during a time gap after receiving the transmission from the source wireless device, the first indication associated with the transmission between the source wireless device and the primary wireless device.

In some examples, the analysis manager 820 may determine that the secondary wireless device received the transmission without error after determining the first indication is received within the time gap. In some examples, determining that the secondary wireless device failed to receive the transmission or received the transmission with one or more errors after determining that the first indication is not received within the time gap, where sending the second indication includes. In some examples, determining that the first indication includes a basic rate/enhanced data rate (BR/EDR) packet or a sequence that includes a preamble followed by an access code, where the time gap is based on a length of time associated with the BR/EDR packet or the sequence.

The acknowledgement manager 825 may send, by the primary wireless device, a second indication of ACK or NAK to the source wireless device based on whether the primary wireless device correctly received the data packet and whether the first indication is received from the secondary wireless device during the time gap. In some examples, the acknowledgement manager 825 may send an ACK in the second indication based on determining that the primary wireless device and the secondary wireless device received the transmission without error.

The scheduling manager 830 may set, based on determining whether the first indication is received from the secondary wireless device, a packet size of at least one logical link control and adaptation protocol (L2CAP) packet to increase the time gap that is between an end of the transmission from the source wireless device and a start time the primary wireless device is scheduled to start transmitting the second indication. In some examples, the scheduling manager 830 may schedule the start time based on the type of packet.

The identification manager 835 may identify, after determining that the first indication is received from the secondary wireless device, a type of packet used for transmitting the first indication.

Figure 9:
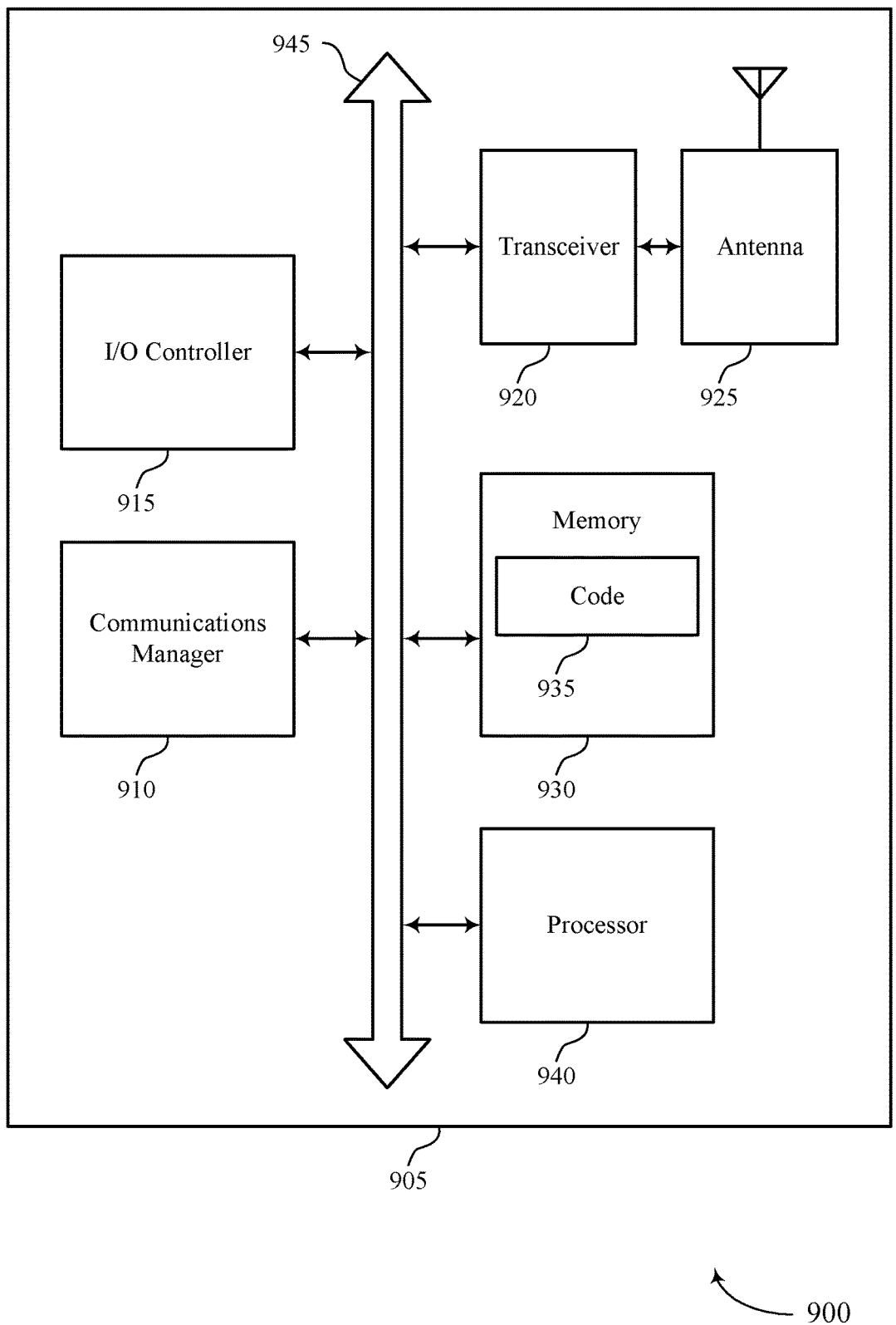
FIG. 9 shows a diagram of a system including a device that supports real-time ACK/NAK from sniffing one or more links by controlling a size of a predetermined packet in accordance with aspects of the present disclosure.

FIG. 9 shows a diagram of a system 900 including a device 905 that supports real-time ACK/NAK from sniffing one or more links by controlling L2CAP MTU size in accordance with aspects of the present disclosure. The device 905 may be an example of or include the components of device 605, device 705, or a device as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, by a primary wireless device, a transmission from a source wireless device over a wireless link established between the source wireless device and the primary wireless device, determine, by the primary wireless device, whether the primary wireless device correctly received a data packet during the transmission, determine, by the primary wireless device, whether a first indication of ACK is received from a secondary wireless device during a time gap after receiving the transmission from the source wireless device, the first indication associated with the transmission between the source wireless device and the primary wireless device, and send, by the primary wireless device, a second indication of ACK or NAK to the source wireless device based on whether the primary wireless device correctly received the data packet and whether the first indication is received from the secondary wireless device during the time gap.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting real-time ACK/NAK from sniffing link by controlling L2CAP MTU size).

The code 935 may include instructions to implement aspects of the present disclosure, including instructions to support real-time ACK/NAK. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
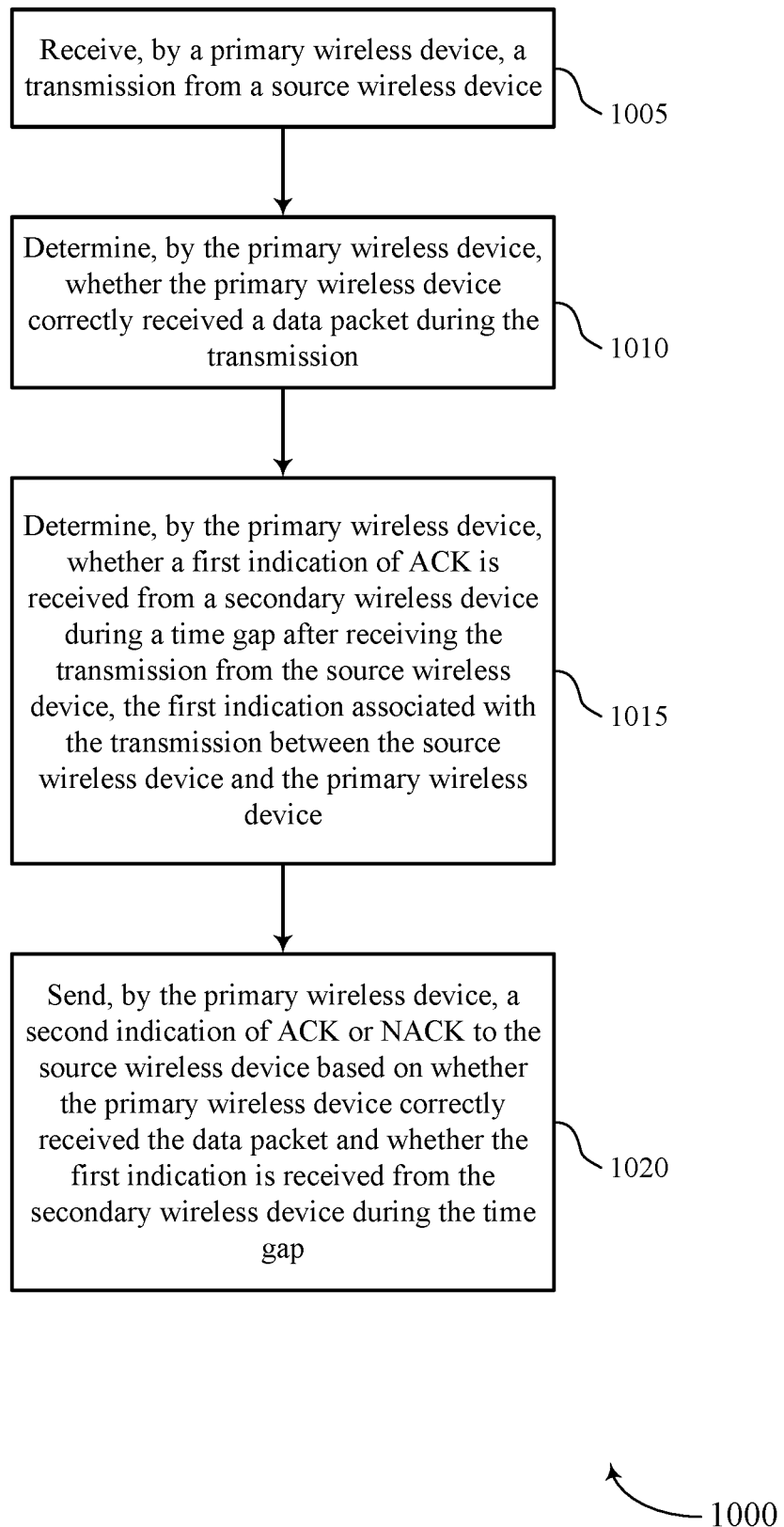
FIGS. 10 and 11 show flowcharts illustrating methods that support real-time ACK/NAK from sniffing one or more links by controlling a size of a predetermined packet in accordance with aspects of the present disclosure.

FIG. 10 shows a flowchart illustrating a method 1000 that supports real-time ACK/NAK from sniffing one or more links by controlling L2CAP MTU size in accordance with aspects of the present disclosure. The operations of method 1000 may be implemented by a device or its components as described herein. For example, the operations of method 1000 may be performed by a communications manager as described with reference to FIGS. 6 through 9. In some examples, a device may execute a set of instructions to control the functional elements of the device to perform the functions described below. Additionally or alternatively, a device may perform aspects of the functions described below using special-purpose hardware.

At 1005, the device may receive, by a primary wireless device, a transmission from a source wireless device over a wireless link established between the source wireless device and the primary wireless device. The operations of 1005 may be performed according to the methods described herein. In some examples, aspects of the operations of 1005 may be performed by a receiving manager as described with reference to FIGS. 6 through 9.

At 1010, the device may determine, by the primary wireless device, whether the primary wireless device correctly received a data packet during the transmission. The operations of 1010 may be performed according to the methods described herein. In some examples, aspects of the operations of 1010 may be performed by a data manager as described with reference to FIGS. 6 through 9.

At 1015, the device may determine, by the primary wireless device, whether a first indication of ACK is received from a secondary wireless device during a time gap after receiving the transmission from the source wireless device, the first indication associated with the transmission between the source wireless device and the primary wireless device. The operations of 1015 may be performed according to the methods described herein. In some examples, aspects of the operations of 1015 may be performed by an analysis manager as described with reference to FIGS. 6 through 9.

At 1020, the device may send, by the primary wireless device, a second indication of ACK or NAK to the source wireless device based on whether the primary wireless device correctly received the data packet and whether the first indication is received from the secondary wireless device during the time gap. The operations of 1020 may be performed according to the methods described herein. In some examples, aspects of the operations of 1020 may be performed by an acknowledgement manager as described with reference to FIGS. 6 through 9.

Figure 11:
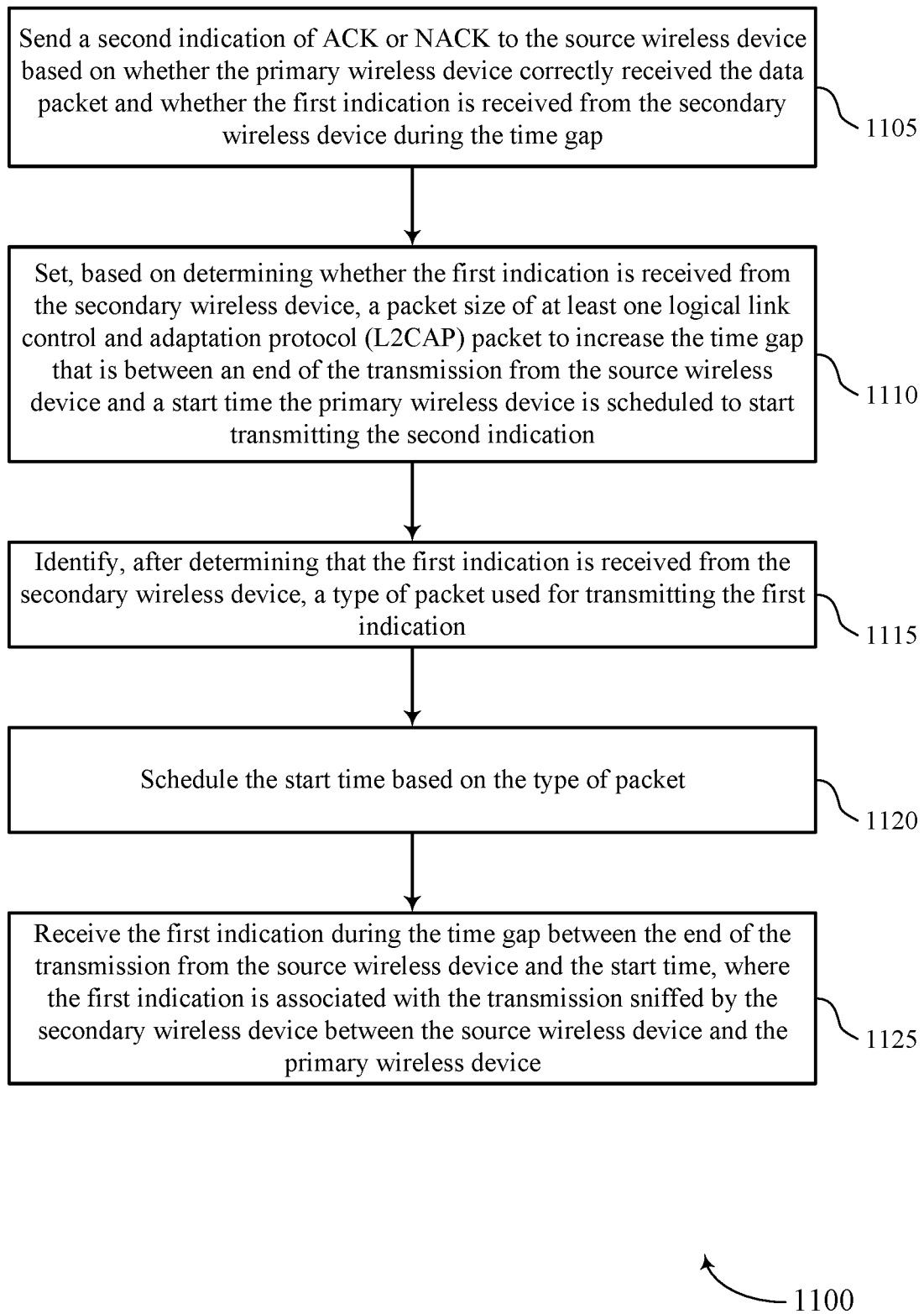

FIG. 11 shows a flowchart illustrating a method 1100 that supports real-time ACK/NAK from sniffing one or more links by controlling L2CAP MTU size in accordance with aspects of the present disclosure. The operations of method 1100 may be implemented by a device or its components as described herein. For example, the operations of method 1100 may be performed by a communications manager as described with reference to FIGS. 6 through 9. In some examples, a device may execute a set of instructions to control the functional elements of the device to perform the functions described below. Additionally or alternatively, a device may perform aspects of the functions described below using special-purpose hardware.

At 1105, the device may send, by the primary wireless device, a second indication of ACK or NAK to the source wireless device based on whether the primary wireless device correctly received the data packet and whether the first indication is received from the secondary wireless device during the time gap. The operations of 1105 may be performed according to the methods described herein. In some examples, aspects of the operations of 1105 may be performed by an acknowledgement manager as described with reference to FIGS. 6 through 9.

At 1110, the device may set, based on determining whether the first indication is received from the secondary wireless device, a packet size of at least one logical link control and adaptation protocol (L2CAP) packet to increase the time gap that is between an end of the transmission from the source wireless device and a start time the primary wireless device is scheduled to start transmitting the second indication. The operations of 1110 may be performed according to the methods described herein. In some examples, aspects of the operations of 1110 may be performed by a scheduling manager as described with reference to FIGS. 6 through 9.

At 1115, the device may identify, after determining that the first indication is received from the secondary wireless device, a type of packet used for transmitting the first indication. The operations of 1115 may be performed according to the methods described herein. In some examples, aspects of the operations of 1115 may be performed by an identification manager as described with reference to FIGS. 6 through 9.

At 1120, the device may schedule the start time based on the type of packet. The operations of 1120 may be performed according to the methods described herein. In some examples, aspects of the operations of 1120 may be performed by a scheduling manager as described with reference to FIGS. 6 through 9.

At 1125, the device may receive the first indication during the time gap between the end of the transmission from the source wireless device and the start time, where the first indication is associated with the transmission sniffed by the secondary wireless device between the source wireless device and the primary wireless device. The operations of 1125 may be performed according to the methods described herein. In some examples, aspects of the operations of 1125 may be performed by a receiving manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

The wireless communications systems described herein may support synchronous or asynchronous operation. For synchronous operation, the devices may have similar frame timing, and transmissions from different devices may be approximately aligned in time. For asynchronous operation, the devices may have different frame timing, and transmissions from different devices may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for acknowledging receipt of information, comprising:

receiving, by a primary wireless device, a transmission from a source wireless device over a wireless link established between the source wireless device and the primary wireless device;

determining, by the primary wireless device, whether the primary wireless device correctly received a data packet during the transmission;

determining, by the primary wireless device, whether a first indication of acknowledgement (ACK) from a secondary wireless device is received by the primary wireless device during a time gap after the primary wireless device receives the transmission from the source wireless device, the first indication associated with the transmission between the source wireless device and the primary wireless device;

setting, based at least in part on determining whe the r the first indication is received from the secondary wire less device, a packet size of at least one logical link control and adaptation protocol packet to increase the time gap that is between an end of the transmission from the source wireless device and a start time the primary wireless device is scheduled to s tart transmitting a second indication; and sending, by the primary wireless device, the second indication of ACK or negative acknowledgement (NAK) to the source wireless device based at least in part on whether the primary wireless device correctly received the data packet and whether the first indication from the secondary wireless device is received by the primary wireless device during the time gap.

2. The method of claim 1, further comprising:
identifying, after determining that the first indication is received from the secondary wireless device, a type of packet used for transmitting the first indication; and
scheduling the start time based at least in part on the type of packet.

3. The method of claim 1, wherein receiving the first indication comprises:
receiving the first indication during the time gap between the end of the transmission from the source wireless device and the start time, wherein the first indication is associated with the transmission sniffed by the secondary wireless device between the source wireless device and the primary wireless device.

4. The method of claim 1, further comprising:
determining that the secondary wireless device received the transmission without error after determining the first indication is received within the time gap.

5. The method of claim 4, wherein sending the second indication comprises:
sending an ACK in the second indication based at least in part on determining that the primary wireless device and the secondary wireless device received the transmission without error.

6. The method of claim 1, further comprising:
determining that the secondary wireless device failed to receive the transmission or received the transmission with one or more errors after determining that the first indication is not received within the time gap; and
sending a NAK in the second indication based at least in part on determining the primary wireless device or the secondary wireless device failed to receive the transmission without error.

7. The method of claim 1, further comprising:
receiving the first indication from the secondary wireless device, wherein receiving the transmission from the source wireless device and receiving the first indication are performed over a same frequency.

8. The method of claim 1, further comprising:
determining that the first indication comprises a basic rate/enhanced data rate (BR/EDR) packet or a sequence that includes a preamble followed by an access code, wherein the time gap is based at least in part on a length of time associated with the BR/EDR packet or the sequence.

9. The method of claim 1, wherein at least one of the primary wireless device and the secondary wireless device, or both, include a wireless earbud device, and wherein the wireless link between the source wireless device and the primary wireless device includes an encrypted piconet link.

10. An apparatus for acknowledging receipt of information, comprising:
a processor,
memory in electronic communication with the processor; and
instructions stored in the memory and executable by the processor to cause the apparatus to:
receive a transmission from a source wireless device over a wireless link established between the source wireless device and a primary wireless device;
determine whether the apparatus correctly received a data packet during the transmission;
determine, by the apparatus, whether a first indication of acknowledgement (ACK) from a secondary apparatus is received by the primary wireless device during a time gap after the primary wireless device receives the transmission from the source wireless device, the first indication associated with the transmission between the source wireless device and the apparatus;
set, based at least in part on determining whether the first indication is received from the secondary apparatus, a packet size of at least one logical link control and adaptation protocol packet to increase the time gap that is between an end of the transmission from the source wireless device and a start time the primary wireless device is scheduled to start transmitting a second indication; and
send, by the apparatus, the second indication of ACK or negative acknowledgement (NAK) to the source wireless device based at least in part on whether the apparatus correctly received the data packet and whether the first indication from the secondary apparatus is received by the apparatus during the time gap.

11. The apparatus of claim 10, wherein the instructions are further executable by the processor to cause the apparatus to:
identify, after determining that the first indication is received from the secondary apparatus, a type of packet used for transmitting the first indication; and
schedule the start time based at least in part on the type of packet.

12. The apparatus of claim 10, wherein the instructions to receive the first indication are executable by the processor to cause the apparatus to:
receive the first indication during the time gap between the end of the transmission from the source wireless device and the start time, wherein the first indication is associated with the transmission sniffed by the secondary apparatus between the source wireless device and the apparatus.

13. The apparatus of claim 10, wherein the instructions are further executable by the processor to cause the apparatus to:
determine that the secondary apparatus received the transmission without error after determining the first indication is received within the time gap.

14. The apparatus of claim 13, wherein the instructions to send the second indication are executable by the processor to cause the apparatus to:
send an ACK in the second indication based at least in part on determining that the apparatus and the secondary apparatus received the transmission without error.

15. The apparatus of claim 10, wherein the instructions are further executable by the processor to cause the apparatus to:
determine that the secondary apparatus failed to receive the transmission or received the transmission with one or more errors after determining that the first indication is not received within the time gap.

16. The apparatus of claim 10, wherein the instructions are further executable by the processor to cause the apparatus to:
receive a first indication from the secondary apparatus, wherein receiving the transmission from the source wireless device and receiving the first indication are performed over a same frequency.

17. An apparatus for acknowledging receipt of information, comprising:
means for receiving, by the apparatus, a transmission from a source wireless device over a wireless link established between the source wireless device and a primary wireless device;

means for determining, by the apparatus, whether the apparatus correctly received a data packet during the transmission;

means for determining, by the apparatus, whether a first indication of acknowledgement (ACK) from a secondary apparatus is received by the primary wireless device during a time gap after the primary wireless device receives the transmission from the source wireless device, the first indication associated with the transmission between the source wireless device and the apparatus;

a processor of the apparatus for setting, based at least in part on determining whether the first indication is received from the secondary apparatus, a packet size of at least one logical link control and adaptation protocol packet to increase the time gap that is between an end of the transmission from the source wireless device and a start time the apparatus is scheduled to start transmitting a second indication; and means for sending, by the apparatus, the second indication of ACK or negative acknowledgement (NAK) to the source wireless device based at least in part on whether the apparatus correctly received the data packet and whether the first indication is received from the secondary apparatus during the time gap.

* * * * *